(12) United States Patent
Eberhard

(10) Patent No.: US 8,024,746 B2
(45) Date of Patent: Sep. 20, 2011

(54) COMMON HANDLER FRAMEWORK

(75) Inventor: Ryan Eberhard, Columbus, OH (US)

(73) Assignee: Oracle International Corporation, Redwood Shores, CA (US)

(*) Notice: Subject to any disclaimer, the term of this patent is extended or adjusted under 35 U.S.C. 154(b) by 949 days.

(21) Appl. No.: 11/952,728

(22) Filed: Dec. 7, 2007

(65) Prior Publication Data

US 2009/0119674 A1 May 7, 2009

Related U.S. Application Data

(60) Provisional application No. 60/985,925, filed on Nov. 6, 2007.

(51) Int. Cl.
*G06F 13/00* (2006.01)

(52) U.S. Cl. ........ 719/330; 709/201; 709/203; 709/217; 709/225

(58) Field of Classification Search ................. 719/330; 709/201, 203, 217, 225
See application file for complete search history.

(56) References Cited

U.S. PATENT DOCUMENTS

| | | | |
|---|---|---|---|
| 7,418,501 B2* | 8/2008 | Davis et al. | 709/225 |
| 7,475,402 B1* | 1/2009 | Carr | 719/313 |
| 7,509,651 B2* | 3/2009 | Catania et al. | 719/316 |
| 7,860,924 B2* | 12/2010 | Betts et al. | 709/203 |
| 7,925,979 B2* | 4/2011 | Forney et al. | 715/733 |
| 2007/0086430 A1* | 4/2007 | Kemp | 370/352 |
| 2007/0233690 A1* | 10/2007 | Bruchlos et al. | 707/10 |
| 2008/0027735 A1* | 1/2008 | Bruchlos et al. | 705/1 |

* cited by examiner

*Primary Examiner* — Andy Ho

(74) *Attorney, Agent, or Firm* — Fliesler Meyer LLP

(57) ABSTRACT

A common handler framework can allow handlers for multiple different types of web services programming models to be used in a single handler chain.

22 Claims, 8 Drawing Sheets

| <<interface>><br>TubelineDeploymentListener |
|---|
| ◇ createClient(in context:ClientTubeAssemblerContext, in items:Set<T1-><br>TubelineAssemblerItem>):void<br>◇ createServer(in context:ServerTubeAssemblerContext, in items:Set<T1-><br>TubelineAssemblerItem>):void |

FIG. 4

<<interface>>
TubeFactory

◇ createClient(in next:Tube, in context:ClientTubeAssemblerContext):Tube
◇ createServer(in next:Tube, in context:ServerTubeAssemblerContext):Tube

FIG. 6

*AbstractTubeFactory*

◇ createClient(in next:Tube, in context:ClientTubeAssemblerContext):Tube
◇ createServer(in next:Tube, in context:ServerTubeAssemblerContext):Tube

FIG. 7

COMMON HANDLER FRAMEWORK

CLAIM OF PRIORITY

This application claims priority to U.S. Provisional Application No. 60/985,925 entitled "COMMON HANDLER FRAMEWORK" by Ryan Eberhard, filed Nov. 6, 2007 which is hereby incorporated by reference.

BACKGROUND

Specifications such as JAX-WS specify the use of handler chains with web services. The handlers of the hander chain operate on web service messages.

BRIEF DESCRIPTION OF THE DRAWINGS

FIG. 4 shows an example of a Tubeline deployment listener.
FIG. 6 illustrates a TubeFactory interface.
FIG. 7 shows an Abstract TubeFactory of one embodiment.

SUMMARY

The JAX-WS programming model is independent from and can be incompatible with the JAX-RPC programming model.

Embodiments of the present invention use a common handler framework to allow multiple different types of web service programming model handlers to be used concurrently.

In one example, handlers for both JAX-WS and JAX-RPC can be used in a single handler chain.

DETAILED DESCRIPTION

Figure 1:
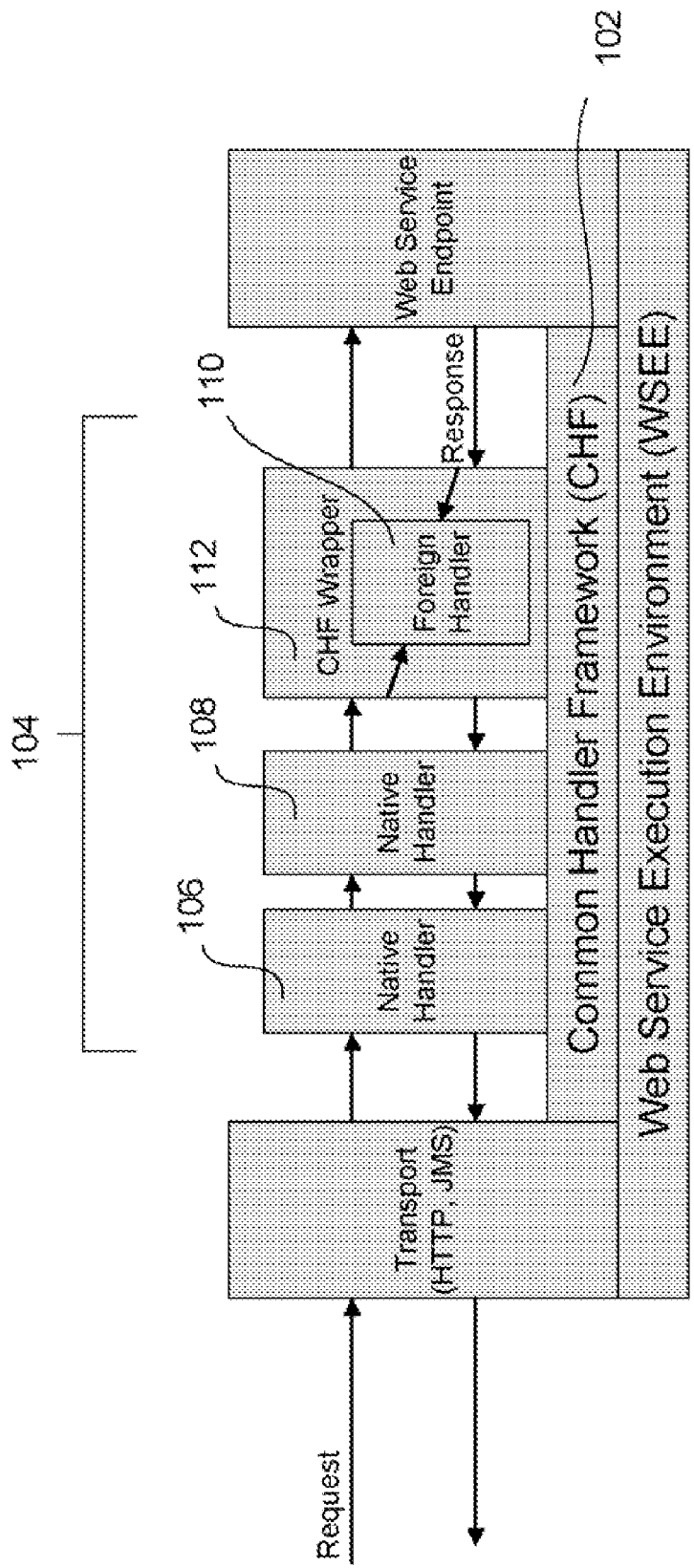
FIG. 1 shows an example of a common handler framework of one embodiment of the present invention.
Figure 2:
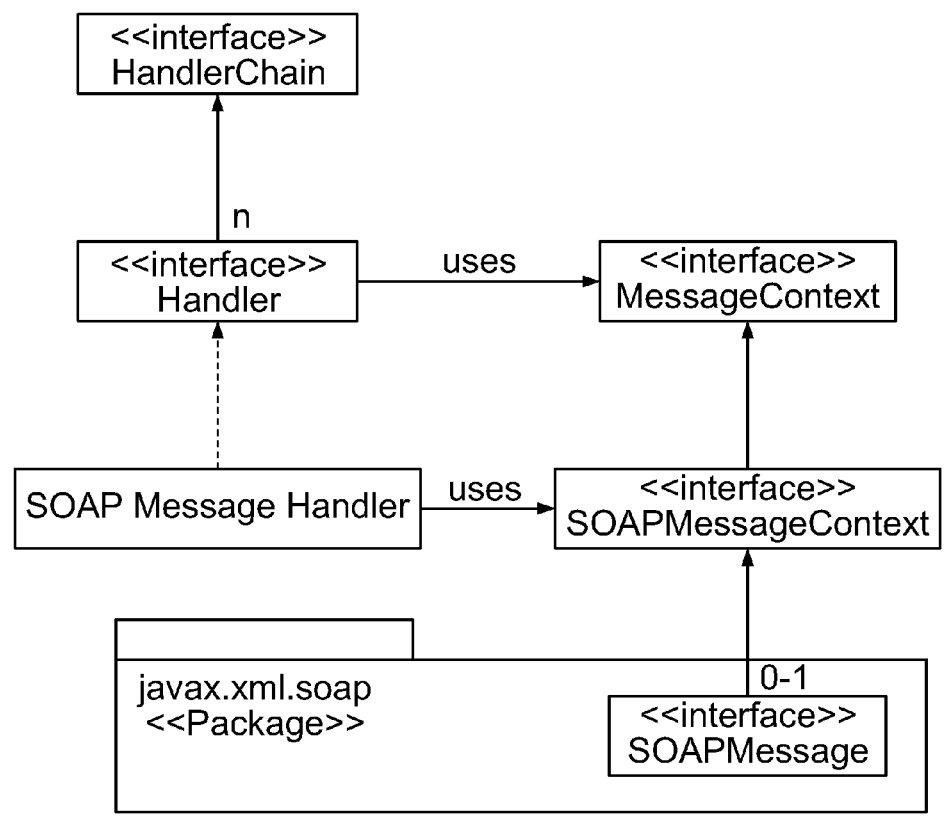
FIG. 2 shows a diagram of JAX-RPC interfaces.
Figure 3A:
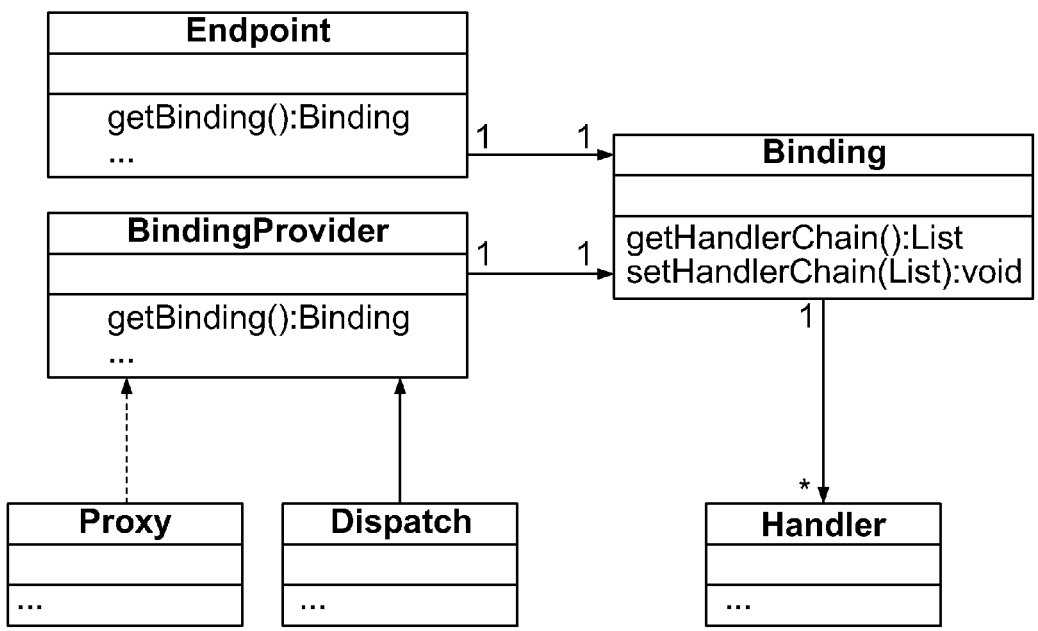
FIGS. 3A and 3B show a diagram of interfaces for JAX-WS.
Figure 3B:
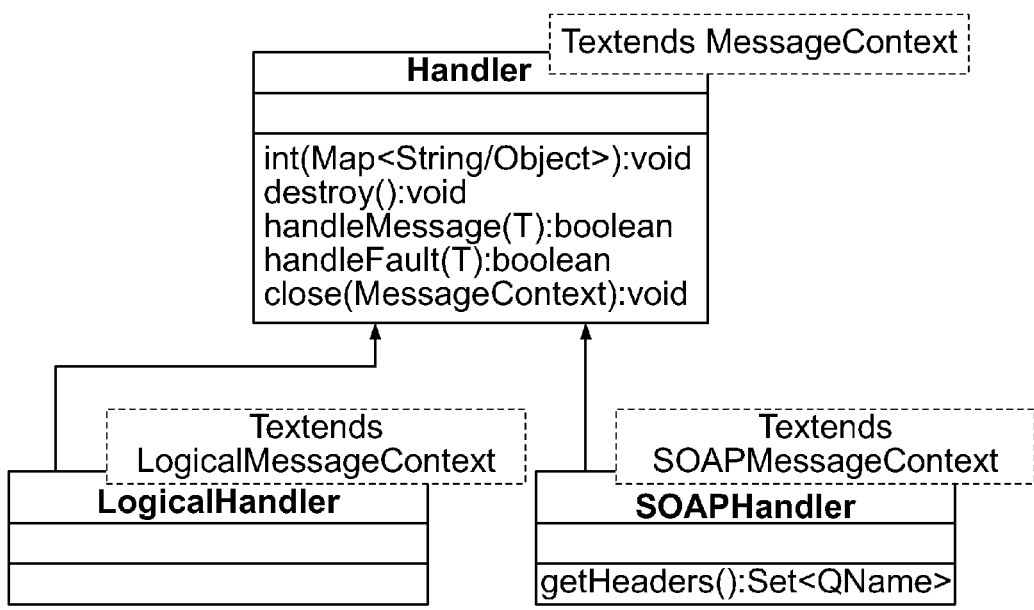
Figure 5:
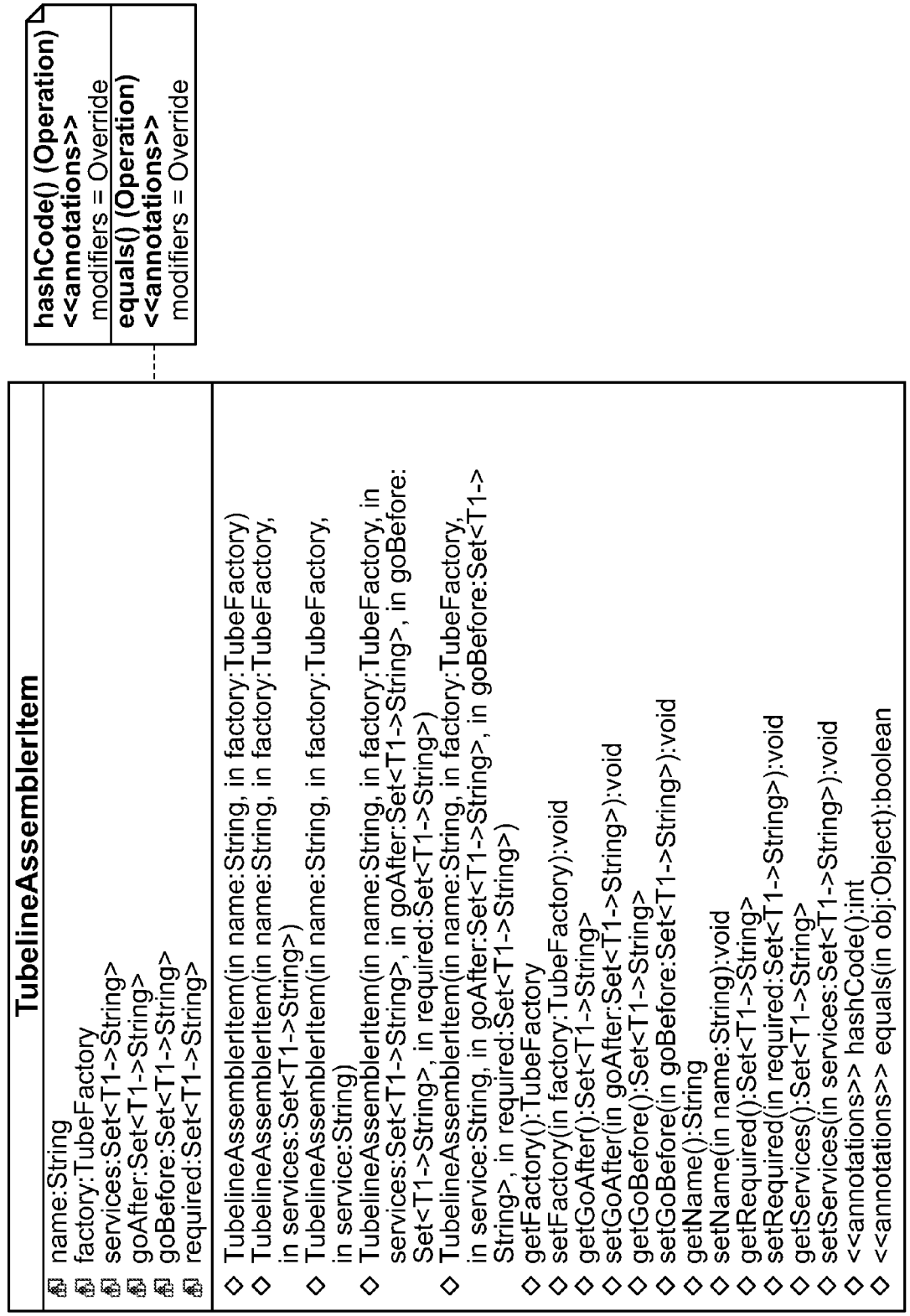
FIG. 5 shows an example of Tubeline AssemblerItem.
Figure 8:
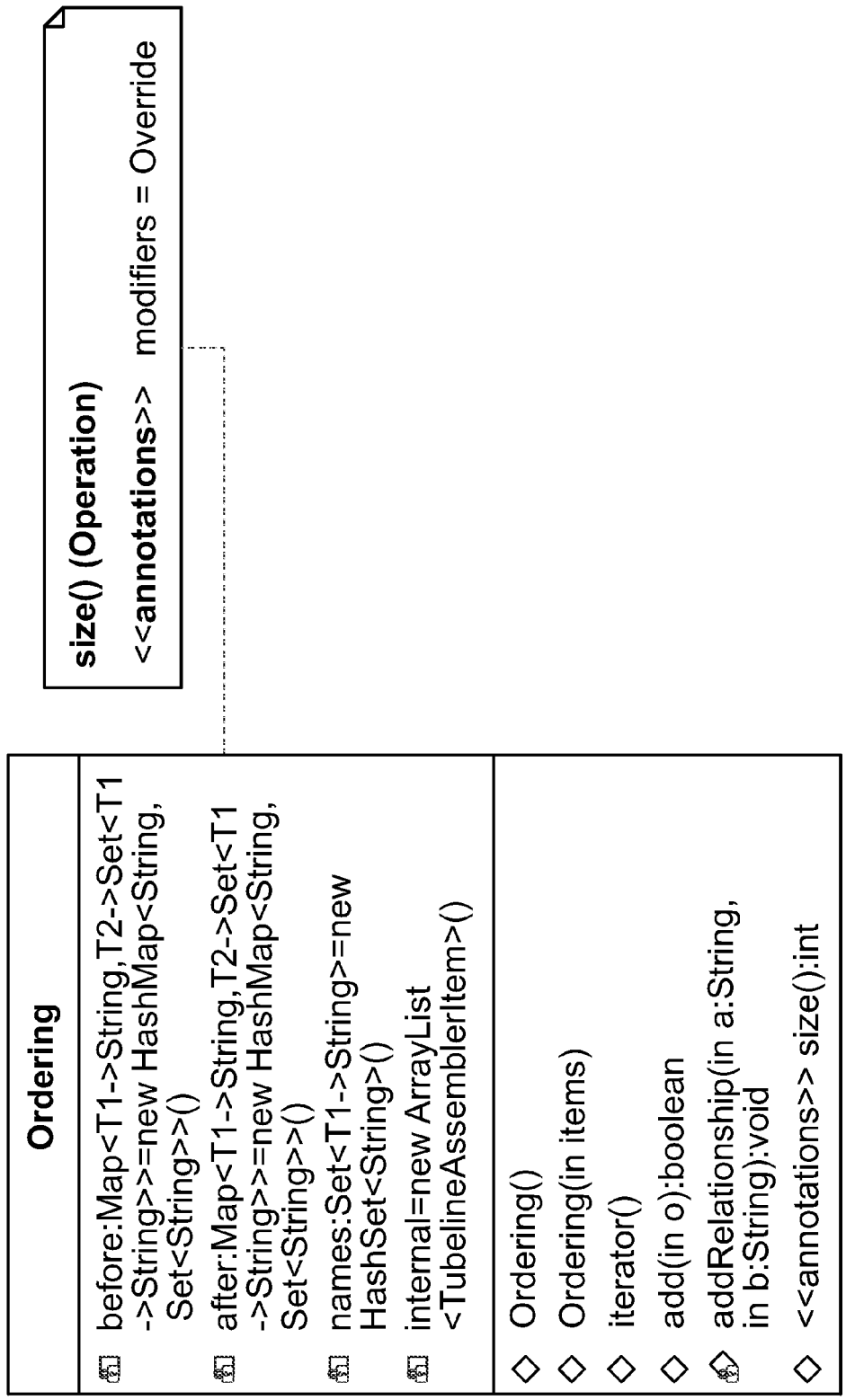
FIG. 8 illustrates an ordering utility class.
Figure 9:
FIG. 9 illustrates a TubeFactoryCreator
Figure 10:
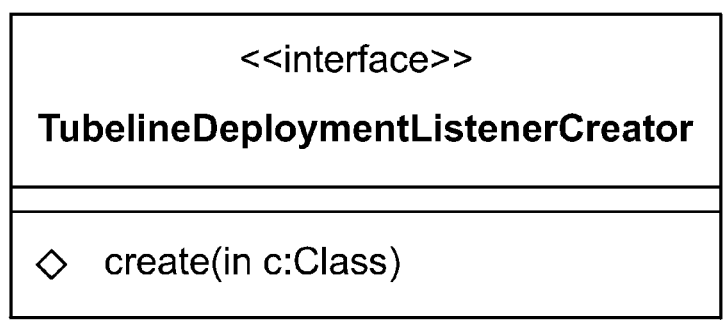
FIG. 10 illustrates a TubelineDeploymentListenerCreator

FIG. 1 shows a computer-based system including a common handler framework 102 to allow handlers for multiple different types of web services programming models to be used in a single handler chain 104.

In FIG. 1, the handler chain 104 includes native handlers 106 and 108 using a first web service programming model and a foreign handler 110 written in a second web servicing programming model. In one example, the handlers can include both JAX-WS and JAX-RPC handlers.

The common handler framework 104 can provide data to the foreign handler 110 in a format native to the web services programming model of the foreign handler 110. In one embodiment, the common handler framework 104 provides for a wrapper 112 over a foreign handler 110 to implement this functionality.

Some of the handlers can be provided by a middleware environment. These handlers can include security handler, a reliable messaging handler and a transaction handler. Other handlers can be provided by a web service application running on the middleware environment.

FIG. 1 illustrates a server-side processing where the request comes in from transport flows through to the actual web service endpoint implantation and then returns. Client-side processing can be identical with respect to the handler model; however, for the client, the initiator would be the client application and would flow through the handler model to the client's transport.

Handlers can implement value-added services, such as security, reliable messaging, transactions, adding additional data, etc. Handlers can be configured by meta-data.

The Common Handler Framework 102 can know the execution environment (e.g. JAX-WS) and therefore knows if a handler is native (i.e. also JAX-WS in this case) or if a handler is foreign. Foreign handlers can be wrapped to allow them to appear as native to other handlers and to the execution environment. Likewise, the wrapping of the foreign handler can allow the execution environment and the other handlers to appear as if they were the same model (e.g. JAX-RPC).

Translation and simulation techniques can cover a handler's view of configuration and request/response paradigms.

The following shows examples of the programming interfaces and configuration files that may be used to configure the tubeline including a handler chain for a JAX-WS 2.1 RI-based client or service and the configuration of the common handler framework (CHF) simulation layer that allows JAX-RPC-based handlers to run within JAX-WS.

A JAX-RPC handler simulation layer, such as that produced by a common handler framework, can allow pre-existing JAX-RPC handlers for the WS-* implementations to run within the JAX-WS environment. Web Services Interoperability Technologies (WSIT) implementations lack important enterprise-class features and can require significant work to integrate with existing application server configuration models. For instance, the WSIT WS-Security and WS-Policy implementations use a WSIT proprietary file for configuring policy rather than supporting a plug-point to integrate annotation and MBean support. Also, the WS-SC implementation contains no conversation storage or clustering features or plug-points that can be used to integrate these features.

The JAX-RPC simulation layer can be sufficiently rich so that pre-existing deployment listeners, such as WsDeploymentListener, can run to add handlers to what they believe is a JAX-RPC handler chain, but which will actually construct a JAX-WS tubeline. At runtime, the simulation layer can invoke the hosted JAX-RPC handlers providing access to handler chain flow-control and message context, such as WlMessageContext.

Since the JAX-WS RI does not provide a rich tubeline assembler model (currently, support is only for taking full control of tubeline generation or for overriding a small set of known tubes), this specification can define such a model. The tubeline assembler model defined here can allow native JAX-WS tubes to co-exist with CHF hosted handlers, while allowing for the configuration from both code and meta-data.

Application Servers, such as Web Logic Server (WLS), can provide a stand-alone client jar for JAX-RPC. In one embodiment, however, the classes in the jar are only sufficiently rich to provide unsecured (no WS-Security) access to services. In order to use WS-Security from a stand-alone client, customers can use the full archive, such as weblogic.jar, in the classpath.

Tubeline deployment can provide a mechanism to control tubeline assembly at deploy time. One implementation can provide at least two uses of this feature: a) deployment of "standard" tubes, including WS-Addressing support and MU (must understand) handling, and b) deployment of tubes in support of JAX-RPC handler environment simulation.

Layered products can be able to use this functionality. Configuration can be by either code (service finder) or meta-data document.

The JAX-RPC Handler Environment Simulation can provide a simulation environment for JAX-RPC handlers and Application Server deployment listeners.

The JAX-RPC handler environment simulation functionality can allow pre-existing JAX-RPC handler implementations to be run under the JAX-WS 2.1 RI environment. The primary goal is to provide supportable WS-* implementations for JAX-WS as quickly as possible.

Since there is significant handler-related code that is executed at deploy-time in order to select handlers for inclusion on the handler chain and to order handlers, the simulation environment can also support an environment for running pre-existing WsDeploymentListener implementations.

However, not every pre-existing Handler or WsDeploymentListener for JAX-RPC is appropriate for the JAX-WS environment. This is because many of the JAX-RPC handlers implement functionality that is built-in to the JAX-WS RI (e.g. OperationLookupHandler or CodecHandler). Therefore, the environment simulation functionality can allow for the configuration of specific WsDeploymentListener implementations or handlers that will be deployed under JAX-WS, rather than rely on existing code in WsBuilder.

As much as is possible and as is required to support the selected JAX-RPC handlers, the simulation environment can provide a replica of the standard JAX-RPC environment.

JAX-RPC handler environment simulation functionality can support a deploy-time environment for pre-existing WsDeploymentListener implementations. Application Server or layered-products can configure which WsDeploymentListener implementations will be enabled for the JAX-WS environment as it is known that not all pre-existing handlers are appropriate.

When the process( ) method of a WsDeploymentListener instance is invoked, the parameter WsDeploymentContext can be fully functional and, in particular, deployment listeners can be able to access the handler list through context.getWsService( ).getPorts( ).next( ).getInternalHandlerList( ).

When the handler list is presented to the first deployment listener, it can be pre-populated with a selected set of HandlerInfo values, as defined below, in order to assist WsDeploymentListener implementations that use these values to assist with ordering and handler insertion. These pseudo HandlerInfo values need not to correspond to actual tubes on the tubeline or JAX-RPC handlers run in simulation.

If other TubelineDeploymentListener or WsDeploymentListener implementations have run ahead of the current WsDeploymentListener, then the handler list can reflect the management operations performed by those listeners. The name of any HandlerInfo in the list can reflect the name of the associated TubelineAssemblerItem.

To configure the processing of a WsDeploymentListener implementation using code, the following can be done:
1. Create a concrete subclass of weblogic.wsee.jaxws.framework.jaxrpc.AbstractTubelineDeploymentListener and implement getDeploymentListenerClass to return the WsDeploymentListener Class instance.
2. Edit META-INF/services/weblogic.wsee.jaxws.tubeline.TubelineDeploymentListerner (or create a new copy elsewhere on the classpath) containing a line that names the concrete class.

If adding META-INF/services/weblogic.wsee.jaxws.tubeline.TubelineDeploymentListener to a web service WAR file, be sure to add the file under WEB-INF/classes/META-INF/services/ . . .

To configure the processing of a WsDeploymentListener implementation or to directly add a Handler to the tubeline using a meta-data file, one can do the following:
3. Create or edit an existing META-INF/tube-config.xml file
   a. For WsDeploymentListener implementations, create config/[server|client]/listener[@class=name] where "name" is the fully-qualified class name for your WsDeploymentListener implementation.
   b. For Handler implementations, create config/[server|client]/assembler-item[@class=name] where "name" is the fully-qualified class name for your Handler implementation.

If adding META-INF/tube-config.xml to a web service WAR file, be sure to add the file under WEB-INF/classes/META-INF/.

| Initial client HandlerInfo values |
| --- |
| HandlerNames.CODEC_HANDLER |
| HandlerNames.ADDRESSING_HANDLER |
| HandlerNames.MIMEHEADER_HANDLER |
| HandlerNames.ASYNC_HANDLER |
| HandlerNames.CONNECTION_HANDLER |

HandlerInfo values that represent TubelineAssemblerItems added by other TubelineDeploymentListener implementations will appear between HandlerNames.MIMEHEADER_HANDLER and HandlerNames.ASYNC_HANDLER, unless those TubelineAssemblerItems have ordering requirements.

| Initial server HandlerInfo values |
| --- |
| HandlerNames.MESSAGE_CONTEXT_INIT_HANDLER |
| HandlerNames.CONNECTION_HANDLER |
| HandlerNames.VERSION_REDIRECT_HANDLER |
| HandlerNames.DIRECT_INVOKE_HANDLER |
| HandlerNames.ADDRESSING_HANDLER |
| HandlerNames.OPERATION_LOOKUP_HANDLER |
| HandlerNames.ONE_WAY_HANDLER |
| HandlerNames.PRE_INVOKE_HANDLER |
| HandlerNames.CODEC_HANDLER |
| HandlerNames.AUTHORIZATION_HANDLER |
| HandlerNames.COMPONENT_HANDLER |

HandlerInfo values that represent TubelineAssemblerItems added by other TubelineDeploymentListener implementations will appear between HandlerNames.AUTHORIZATION_HANDLER and HandlerNames.COMPONENT_HANDLER, unless those TubelineAssemblerItems have ordering requirements.

JAX-RPC handler environment simulation functionality can support a runtime environment for Hosted handler implementations. To do this, the simulation can correctly process exceptions and return values from Handler methods and Handlers can be able to cast the parameter MessageContext as WlMessageContext and access all methods and properties, except as noted.

Additionally, the properties available on the message context can be seeded. These properties can come from mandates in the JAX-RPC 1.1 specification or from Handlers run earlier in the handler chain.

| Property Conversion | |
|---|---|
| MessageContext property name | JAX-WS MessageContext property name |
| Stub.USERNAME_PROPERTY | javax.xml.ws.security.auth.username |
| Stub.PASSWORD_PROPERTY | javax.xml.ws.security.auth.password |
| Stub.ENDPOINT_ADDRESS_PROPERTY | javax.xml.ws.service.endpoint.address |

Simulated Handlers

The following handlers will not be run under JAX-WS; however, other handlers that will run on JAX-WS make references to values that these handlers add to the MessageContext. Therefore, the environment simulation can provide the following MessageContext properties for hosted Handlers.

MessageContextInitHandler

The MessageContextInitHandler can be simulated on the server-side only. During deployment of JAX-WS services, the WebLogic deployment sub-system can make the DeployInfo available, which we persist as part of the Container SPI (WLSContainer).

The header can understand processing.

If a handler hosted in the simulated environment supports GenericHandler.getHeaders( ), which returns QNames for headers understood by this handler, then JAX-RPC handler environment simulation will mark matching headers on inbound messages as understood so that the standard MU tubes operate correctly.

Where JAX-RPC clients used code like this:

Stub stub=(Stub) port;

stub._setProperty(name, value);

. . . JAX-WS clients can use:

| MessageContext property name | Source |
|---|---|
| WlMessageContext.CONTEXT_PATH | DeployInfo info: info.getContextPath( ) |
| WlMessageContext.SECURITY_REALM | DeployInfo info: info.getSecurityRealmName( ) |
| WlMessageContext.APPLICATION_ID | DeployInfo info: info.getApplication( ) |
| WlMessageContext.STREAM_ATTACHMENTS | DeployInfo info: Boolean.valueOf(info.getWlPortComp( ).getStreamAttachments( )) |

In one embodiment, the OperationLookupHandler is simulated on the server-side only.

((BindingProvider)port).getRequestContext( ).put(name, value);

| MessageContext property name | Source |
|---|---|
| OperationLookupHandler.OPERATION_NAME_PROPERTY | packet.getMessage( ).getOperation(wsdlPort).getName( ) |

In one embodiment, on the client-side only, handlers can need access to the cross-invocation properties of the client that are used to seed future messages.

The JAX-WS RI supplies tubes that implement WS-Addressing for the client and server. The Application Server support for JAX-WS can use these tubes rather than running

| MessageContext property name | Source |
|---|---|
| WLStub.INVOCATION_PROPERTIES | packet.proxy.getRequestContext( ) |

| Exceptions | |
|---|---|
| Handler throws . . . | Re-thrown by JAX-WS Tube as . . . |
| javax.xml.rpc.soap.SOAPFaultException | javax.xml.ws.soap.SOAPFaultException |
| javax.xml.rpc.JAXRPCException | javax.xml.ws.WebServiceException | the pre-existing JAX-RPC addressing handlers in the simulation environment. For general support of WS-Addressing, this can be sufficient. However, certain pre-existing JAX-RPC handlers (most notably the WS-RM handlers) rely on message context properties set by the JAX-RPC addressing handlers.

These message context properties can be populated into the simulated context.

Performance should not be impacted for use cases not using hosted Handlers.

Performance under JAX-WS with WS-Policy and WSS enabled is comparable with JAX-WS without security as JAX-RPC with security is with JAX-RPC without security (i.e. ratios should be consistent).

The Common Handler Framework functionality can depend and make requirements on the Application Server support for JAX-WS 2.1.

The JAX-WS RI can be packaged in the following modules:
    glassfish.jaxws.rt__2.11.jar
    glassfish.jaxws.fastinfoset__2.1.0.jar
    glassfish.jaxws.resolver__2.1.0.jar
    glassfish.jaxws.saaj.impl__2.1.0.jar
    glassfish.jaxws.sjsxp__2.1.0.jar
    glassfish.jaxws.tools__2.1.1.jar
    glassfish.xmlstreambuffer__0.1.118.jar The WebLogic WSEE module is packaged in the following module:
    weblogic.jar (server)
    wseeclient.jar (client)

JDK 6.0 currently contains an older version of the JAX-WS RI (version 2.0.1). This can cause incompatibilities with our version of the JAX-WS RI, which is a modification on version 2.1.1. The Glassfish JAX-WS RI jars can be staged in the endorsed directory of the JDK.

The JAX-RPC stack can support a set of classes for programmatic dispatch including, most importantly, weblogic.wsee.jaxrpc.SoapDispatch.

Callers wishing to do internal invocations based on an endpoint can use the JAX-WS API's.

The schema for the tubeline deployment meta-data configuration file, META-INF/tube-config.xml, can be as follows:

```
<?xml version="1.0"?>
<xsd:schema xmlns:xsd="http://www.w3.org/2001/XMLSchema"
targetNamespace="http://www.bea.com/weblogic/wsee/jaxws/framework/
jaxrpc/tube-config"
  xmlns="http://www.bea.com/weblogic/wsee/jaxws/framework/jaxrpc/
tube-config"
elementFormDefault="qualified">
  <xsd:complexType name="list">
    <xsd:sequence>
      <xsd:element name="item" type="xsd:string" minOccurs="1"
maxOccurs="unbounded"/>
    </xsd:sequence>
  </xsd:complexType>
  <xsd:complexType name="assembler-item">
    <xsd:sequence>
      <xsd:element name="after" type="list" minOccurs="0"/>
      <xsd:element name="before" type="list" minOccurs="0"/>
      <xsd:element name="required" type="list" minOccurs="0"/>
    </xsd:sequence>
    <xsd:attribute name="class" type="xsd:string" use="required"/>
    <xsd:attribute name="name" type="xsd:string" use="optional"/>
  </xsd:complexType>
  <xsd:complexType name="listener">
    <xsd:attribute name="class" type="xsd:string" use="required"/>
```

-continued

```
  </xsd:complexType>
  <xsd:complexType name="listeners">
    <xsd:sequence>
      <xsd:element name="listener" type="listener" minOccurs="0"
maxOccurs="unbounded"/>
      <xsd:element name="assembler-item" type="assembler-item"
minOccurs="0" maxOccurs="unbounded"/>
    </xsd:sequence>
  </xsd:complexType>
  <xsd:complexType name="deployment-listeners">
    <xsd:sequence>
      <xsd:element name="client" type="listeners" minOccurs="0"/>
      <xsd:element name="server" type="listeners" minOccurs="0"/>
    </xsd:sequence>
  </xsd:complexType>
  <xsd:element name="config">
    <xsd:complexType>
      <xsd:sequence>
        <xsd:element name="deployment-listeners"
type="deployment-listeners"/>
      </xsd:sequence>
    </xsd:complexType>
  </xsd:element>
</xsd:schema>
```

JAX-RPC 1.1 defines interfaces for SOAP-based message handlers that are configurable per endpoint (client or server) and that may validate or modify the SOAP message. Containers are specifically allowed by the specification to define proprietary handler API's for other purposes (e.g. stream based processing); however, application servers, such as WebLogic server, can use the same interfaces for internally developed handlers and those defined by customers.

In one embodiment, application servers can manage internal and user-developed handlers separately. In one embodiment, internal handlers can be managed through a handler list hardcoded in WsBuilder and through a set of deployment listeners that add additional headers (e.g. security). Deployment listeners are configured through a configuration file that can be modified by layered products, but not by customers. User-developed handlers can be configured through standard annotations, configuration files, or MBeans. The internal handler set can include a handler that is responsible for invoking the user-developed handler list.

Handler classes can specify a default constructor because instances are instantiated using reflection.

JAX-RPC 1.1 implementations can include an implementation of HandlerChain, which is responsible for invoking registered handlers. The HandlerChain may use invocation policy to decide in what order to invoke handlers, but the default invocation policy is to invoke handlers in the order of registration. Response and fault processing need never invoked for one-way methods. In one embodiment, support the default invocation policy, but deployment listeners can contain complex code to sort handlers during the registration process.

SOAPMessageContext can provide handler methods access to the SOAP message as a javax.xml.soap.SOAPMessage instance.

Instance Creation and State Management can be created via reflections and will be initialized using init( ) method.

In one embodiment, instances are not considered to be re-entrant, but may be pooled for reuse.

Request and response related state can be stored in the properties of the MessageContext (super interface of SOAPMessageContext). JAX-RPC 1.1 can define a small number of standard properties; however, many MessageContext properties, used by the existing WebLogic handlers, can be proprietary.

Handler instances should not rely on thread-local state to share state between handler instances.

JAX-WS 2.1 also defines interfaces for a handler model, including SOAP-based protocol handlers that can inspect and modify the SOAP message in a similar fashion to JAX-RPC SOAP message handlers.

Implementations, like the Glassfish JAX-WS RI, are also free to define proprietary handler models as long as they support the standard model. The JAX-WS RI defines a proprietary Pipe/Tube model, including providing an implementation for a Tube that invokes the JAX-WS registered handlers. Handlers may be registered using standard annotations and configuration files or by defining an implementation of HandlerResolver.

Instances can be created using reflection and thus require a no-argument constructor. Handlers may register for dependency injection using javax.annotation.Resource annotation. Handlers may also register for post-injection initialization using javax.annotation.PostConstruct.

Once this initialization is done, the handler instance can be ready for use. Prior to destroying the handler instance, the method registered using the javax.annotation.PreDestroy annotation will be called, but this is not guaranteed per specification.

Request and response state can be stored in the invocation properties of the MessageContext (SOAPMessageContext for SOAPHandlers), which can be conceptually very similar to the JAX-RPC model. However, the JAX-WS standard invocation properties names are not the same as for JAX-RPC.

Handler instances should not rely on thread-local state to share state between handler instances.

The JAX-WS RI defines a proprietary set of APIs for internal handlers that include Pipes and Tubes, which are effectively "Pipes 2.0".

In the Pipe model, an ordered set of Pipes is defined for each endpoint at deployment time. Each Pipe in the "pipeline" is aware of the next pipe in the chain. Pipeline building is configured through a PipelineAssembler. The JAX-WS RI contains a default implementation, StandalonePipeAssembler, and allows for the implementation of the PipelineAssembler to be overridden.

The StandalonePipeAssembler can build a pipeline that contains a small number of required and/or well-known pipes through callbacks to a pipeline hook (ClientPipelineHook/ ServerPipelineHook). These callbacks can include createClientMUPipe( ), createHandlerPipe( ), createSecurityPipe( ), createTransportPipe( ), etc. Environments can override the creation of the pipeline hook as a way to control the creation of one of these well-known pipes without having to take over general pipeline creation.

The main runtime method for Pipes is "Packet process (Packet)" where the parameter Packet represents the request state and the return value will specify the response state. In the normal success use-case, Pipe implementations are expected to call process on the next pipe in the chain (after modifying the Packet or contained Message, if necessary) and then inspect or modify the return-value Packet before returning from its own process method.

While this is a simple programming model, it does mean that an individual thread is blocked on the transport at the client for every concurrent two-way request. This tie between threads and request/response state was the technical issue that drove the creation of Tubes in the JAX-WS RI 2.1.

The Tube model is also built on an ordered set of Tubes for each endpoint that is defined at deployment time. The configuration for Tubes is analogous to that of Pipes (TubelineAssemler, StandaloneTubeAssembler, etc.), with the exception of the pipeline hook which does not have a Tube analog. The only way to override "tubeline" creation is to provide an implementation of TubelineAssembler; however, a custom implementation can override or delegate to StandaloneTubeAssembler.

Rather than having a single process( ) method, as for Pipes, Tubes have separate methods for processRequest( ) and processResponse( ). Also, while Tubes are expected to know the next Tube in the tubeline, each Tube does not directly invoke the next Tube. Instead, processRequest( ) and processResponse( ) return an object that indicates the desired "next action" (NextAction). Then, an internal controller invokes the next Tube and this invocation could be on a different thread or after a delay (e.g. server-side is waiting for the completion of an asynchronous service invocation and will now send response to client).

The JAX-WS RI 2.1 provides Tube implementations for all of the standard handlers (e.g. WS-A, MU) for which it earlier had Pipes. It also support mixed Pipes and Tubes in the same chain. The internal controller automatically adapts for Pipes with the caveat that as soon as a Pipe is detected in the chain all further invocations will be synchronous and on the same thread using the rules for Pipes.

Globally, the JAX-WS RI supports the services model (i.e. META-INF/services) to allow environments to plug-in different implementations for well-known interfaces (see ServiceFinder).

On both the client and server, we can use the services model to override "tubeline" creation by specifying an implementation using: META INF/services/com.sun.xml.ws.api.pipe.TubelineAssemblerFactory In a custom TubelineAssembler (created by the registered Factory), we can create tubelines that include JAX-WS RI standard tubes, WSIT pipes, and/or wrapped versions of our current JAX-RPC handlers, as desired. Additionally, on the server-side only, environments such as WebLogic can override the TubelineAssemblerFactory using a Container (com.sun.xml.ws.api.server.Container.getSPI(TubelineAssemblerFactory.class)) implementation. When a Container is present, the Container is queried for a TubelineAssemblerFactory before the services model is used.

Controlling tubeline assembly at deployment time can be a pre-requisite for JAX-RPC handler environment simulation.

Out of the box, the JAX-WS RI 2.1 supplies only the ability to add a small number of "well known" tubes to the tubeline (e.g. addressing support) or to take over full control for tubeline generation.

The functionality described in this section begins with the design assumption that the implementation will take over full control of tubeline generation and then provide support for aggregating tubeline items from many sources (standard tubes, CHF support, WSIT, layered products, etc.), ordering and validating the items in the tubeline, and finally building the tubeline.

Tubeline deployment functionality can support accepting tubeline items from a variety of sources, including:
  Standard set of tubes, e.g. WS-Addressing support and
    monitoring tubes
  Application Server provided tubes
  Layered product specific tubes
  Application-specific (service or client) tubes
This functionality can utilize the standard class loader resource and service finder (i.e. META-INF/services) paradigms. In one embodiment on the service, the class loader of the service implementation class can be used. On the client, the class loader of the client delegate can be used. Configuration sources need not be dependent on the order in which they are processed.

In one embodiment, Tubeline deployment functionality allows tube items to specify ordering requirements (i.e. tubes that go before or after the current item) and requirements for related tubes that can be present in the final tubeline. Implementations that add tube items are not be required to provide their own tubeline sorting or validation. Ordering requirements and related tube requirements can be kept separate. Specifically, ordering requirements will not imply existence requirements.

On the client, tube line items can specify a requirement to be after the "client" or before the "connection" using these literal constants to force ordering to move the generated tubes nearer to the tubeline end at the client or connection, respectively. Tube line items specifying after "client" can appear ahead of any other tube line item that does not also specify that it is after "client". Similarly, tube line items specifying before "connection" can be ordered after all other items that do not also specify before "connection". Configuring before "client" or after "connection" can generate a deployment-time exception. Configuring impossible ordering relationships with tubeline items that do not specify after "client" or before "connection" can also generate an error.

On the server, tube line items can specify a requirement to be after the "connection" or before the "invoker" using these literal constants to force ordering to move the generated tubes nearer to the tubeline end at the connection or invoker, respectively. Tube line items specifying after "connection" can appear ahead of any other tube line item that does not also specify that it is after "connection". Similarly, tube line items specifying before "invoker" can be ordered after all other items that do not also specify before "invoker". Configuring before "connection" or after "invoker" will generate a deployment-time exception. Configuring impossible ordering relationships with tubeline items that do not specify after "connection" or before "invoker" can also generate an error.

Tubeline deployment functionality must support tubes mix-and-matched from various sources or technologies, including:

Support for native tubes and simulated JAX-RPC handlers interspersed in the tubeline Support for name or service referencing regardless of underlying tube technology Tubeline deployment functionality can support configuration of tube items using an XML-based meta-data file, named META-INF/tube-config.xml. If multiple files are available via the class loader resource handler, they can all be processed. The meta-data file schema can support separate configuration of client and service tubeline items and support for either referencing deployment listeners or individual tubeline items, including support for all ordering, tube reference, and mix-and-match requirements listed above.

Tubeline deployment functionality can generate tubeline items for standard tubes.

Client tubeline items

| Tubeline Item Name | Tube source | Description |
| --- | --- | --- |
| "dump" | context.createDumpTube | Debug dump tube |
| "wsa" | context.createWsaTube | WS-A tube |
| "mu" | context.createClientMUTube | Client "Must Understand" processing |
| "handler" | context.createHandlerTube | JAX-WS handler tube |

Tubeline items need not specify service values. Tubeline items can specify that they should appear after "client" and will be ordered as in the table, top to bottom.

Server tubeline items

| Tubeline Item Name | Tube source | Description |
| --- | --- | --- |
| "handler" | context.createHandlerTube | JAX-WS handler tube |
| "monitoring" | context.createMonitoringTube | WLS monitoring tube (e.g. diagnostics support) |
| "mu" | context.createServerMUTube | Server "Must Understand" processing |
| "wsa" | context.createWsaTube | WS-A tube |

Tubeline items need not specify service values. Tubeline items can specify that they should appear before "invoker" and will be ordered as in the table, top to bottom.

JAX-WS can provide a service programming model where the service implementation is passed a Source, DataSource, or SOAPMessage representing the message payload or, optionally, just the SOAP message body. This model can be used to implement dynamic web services or can be used simply when the application wishes to not use JAXB marshalling.

Tubeline deployment functionality must generate tubeline items for provider-based services in exactly the same manner as for JWS services.

JAX-WS can provide a client programming model where the client generates request messages as a Source, SOAPMessage, DataSource, or JAXB objects providing either the message payload or just the SOAP message body. This model can be used to implement dynamic service clients.

Tubeline deployment functionality can generate tubeline items for dispatch-based clients in the same manner as for clientgen, JAXB-based clients.

Using the provider and dispatch models together, along with the XML/HTTP binding (not SOAP) can allow JAX-WS to provide basic support for REST services.

Tubeline deployment functionality can generate tubeline items for REST services and client. As there will be no SOAP message in a REST exchange, tubes that are part of a REST tubeline can receive an error if they attempt to access the SOAPMessage property. JAX-RPC environment simulation is not required for REST services and clients.

Since the standard tubeline items (described above) load the built-in client and server must understand (MU) tubes, additional tubes that process headers that may be marked with must understand equal true must be sorted nearer the connection.

These tubes can mark that they have understood a header using packet.getMessage( ).getHeaders( ) to get the HeaderList and then headerList.understood(int) passing the index of the header in the list.

The JAX-WS RI provides limited support for overriding the last item on the tubeline ("terminal tube") for either the client or the server.

On the client side, this terminal tube is the connection tube ("transport tube"). Layered products can override the connection tube by implementing com.sun.xml.ws.api.TransportTubeFactory and registering the implementation using the META-INF/services pattern.

On the server-side, there need be no leading tube that represents the connection; instead, there can be a connection object and a set of adapters that hook-up the servlet container request and response objects to the beginning of tubeline execution.

The terminal tube for the server-side is the invoker and executes the target method of the JWS class instance. While the invoker tube cannot be replaced, the JWS class instance can be enhanced using Spring.

In the JAX-WS RI, the codec is created by the object representing the binding. There are static binding instances for SOAP 1.1 and 1.2, with and without MTOM, and for XML/HTTP. The codec cannot be overridden for these bindings. However, new binding types may specify their own codec.

The WSIT codebase also works under the assumption that it will take over primary control of generating the client and server tubelines, as application server can do, complicating integration of WSIT tubes. This is understandable as there is no functionality for assembling tubeline items in the RI like the functionality defined in this specification. A further complication is that many WSIT tubes expect configuration via WSIT configuration files. Fortunately, some WSIT tubes, such as the WS-MEX support are simpler and can more easily be integrated with an application server.

Here is a sample of how to integrate a WSIT tube into the server-side tubeline using the WS-MEX support as an example:

```
1. Implement a TubelineDeploymentListener
public class WSMEXDeploymentListener implements TubelineDeploymentListener {
    public void createClient(ClientTubeAssemblerContext context,
Set<TubelineAssemblerItem> items) {
        // no-op
    }
    public void createServer(ServerTubeAssemblerContext context,
Set<TubelineAssemblerItem> items) {
        items.add(new TubelineAssemblerItem("mex", new
AbstractTubeFactory( ) {
            public Tube createServer(Tube next,
ServerTubeAssemblerContext context) {
                return new
com.sun.xml.ws.mex.server.MetadataServerPipe(context.getEndpoint( ), next);
            }
        }));
    }
}
2. Register the TubelineDeploymentListener implementation
Use any of the supported methods to register the tubeline deployment listener
implementation class (WSMEXDeploymentListener in this sample) with the tubeline
deployment functionality and server-side tubelines will include the WSIT WS-MEX
pipe.
```

The following gives user interface requirements on one embodiment which JAVA Programming Interface can be part of.

The package: weblogic.wsee.jaxws.tubeline.

TubelineDeploymentListener can be a Service interface for implementations that manage items on the tubeline.

Service interface for managing TubelineAssemblerItem instances for the tubeline of a particular context. Environments can register available TubelineDeploymentListener implementations using the services framework. Registered implementations are located by searching the class loader for META-INF/services/weblogic.wsee.jaxws.tubeline. TubelineDeploymentListener resources. On the server, the classloader for the service implementation class can be used. On the client, the classloader of the client delegate can be used. Located resources must indicate text files containing implementations class names, one per line.

| Method Summary | |
|---|---|
| void | createClient(com.sun.xml.ws.api.pipe.ClientTubeAssemblerContext context, java.util.Set<TubelineAssemblerItem> items)<br>Inspect and modify TubelineAssemblerItemS for the client based on functionality supported by listener. |
| void | createServer(com.sun.xml.ws.api.pipe.ServerTubeAssemblerContext context, java.util.Set<TubelineAssemblerItem> items)<br>Inspect and modify TubelineAssemblerItemS for the server based on functionality supported by listener. | createClient
void    createClient(com.sun.xml.ws.api.pipe.ClientTubeAssemblerContext contex, java.util.Set<TubelineAssemblerItem>items)

Inspect and modify TubelineAssemblerItemS for the client based on functionality supported by listener. This method may remove items from the set. The set implementation will maintain iteration ordering based on insertion ordering.
Parameters:
context—Assembler context
items—Set of TubelineAssemblerItemS
createServer void    createServer(com.sun.xml.ws.api.pipe.ServerTubeAssemblerContext contex, java.util.Set<TubelineAssemblerItem>items)

Inspect and modify TubelineAssemblerItemS for the server based on functionality supported by listener. This method may remove items from the set. The set implementation will maintain iteration ordering based on insertion ordering.
Parameters:
context—Assembler context
items—Set of TubelineAssemblerItemS
TubelineAssemblerItem Meta-data class instance for single tube on the tubeline allows the specification of name, service values, ordering requirements, related tube requirements, and tube construction.
Class TubelineAssemblerItem
java.lang.Object
└weblogic.wsee.jaxws.tubeline.TubelineAssemblerItem
public class TubelineAssemblerItem extends java.lang.Object Requirements and factory for a single tubeline item. The JAX-WS deployer can use all of the configured TubelineAssemblerItemS (see TubelineDeploymentListener) to first validate that a legal tubeline can be built, then order the tubeline assemblers, and finally generate a tubeline for the client or service.

Each TubelineAssemblerItem can specify a unique name that will appear in relevant logs and by which this item can be referred by other TubelineAssemblerItemS. TubelineAssemblerItemS also can specify a TubeFactory, which can generate Tube instances, as required.

Ordering of TubelineAssemblerItemS can be controlled by allowing each item to specify the set of other items that it must go before or go after, respectively. Items that have no before or after relationship requirement can be ordered as they were in the Set of items generated by the TubelineDeploymentListenerS. Ordering requirements do not imply a requirement that other items exist in the configuration, e.g. if a "reliable-messaging" item specifies that it must go before a "security" item this only affects ordering but will not invalidate the configuration if no item named "security" or supporting a service with that name is present.

Requirements that other TubelineAssemblerItemS be present in the tubeline can be specified by means of a set of mixed item names or supported service values. To control ordering and require that items be present, use both the required set and the go before or go after sets.

| Constructor Summary |
|---|
| TubelineAssemblerItem(java.lang.String name, TubeFactory factory)<br>    Creates item with name and factory. |

| Constructor Summary |
|---|
| TubelineAssemblerItem(java.lang.String name, TubeFactory factory, java.util.Set<java.lang.String> goAfter, java.util.Set<java.lang.String> goBefore, java.util.Set<java.lang.String> required)<br>    Creates item with name, factory, mandates on items that must go before or go after this item, and set of required names that must be present in the final tubeline. |

| Constructor Summary |
|---|
| TubelineAssemblerItem(java.lang.String name, TubeFactory factory)<br>    Creates item with name and factory.<br>TubelineAssemblerItem(java.lang.String name, TubeFactory factory, java.util.Set<java.lang.String> goAfter, java.util.Set<java.lang.String> goBefore, java.util.Set<java.lang.String> required)<br>    Creates item with name, factory, mandates on items that must go before or go after this item, and set of required names that must be present in the final tubeline. |

| Constructor Summary |
|---|
| TubelineAssemblerItem(java.lang.String name, TubeFactory factory)<br>    Creates item with name and factory.<br>TubelineAssemblerItem(java.lang.String name, TubeFactory factory, java.util.Set<java.lang.String> goAfter, java.util.Set<java.lang.String> goBefore, java.util.Set<java.lang.String> required)<br>    Creates item with name, factory, mandates on items that must go before or go after this item, and set of required names that must be present in the final tubeline. |

| | Method Summary |
|---|---|
| boolean | equals(java.lang.Object obj) |
| TubeFactory | getFactory( )<br>    Gets tube factory property |
| java.util.Set<java.lang.String> | getGoAfter( )<br>    Gets set of item names for items that must go after this item |
| java.util.Set<java.lang.String> | getGoBefore( )<br>    Gets set of item names for items that must go before this item |
| java.lang.String | getName( )<br>    Gets item name |
| java.util.Set<java.lang.String> | getRequired( )<br>    Gets set of item names that must be present in final tubeline |
| int | hashCode( ) |
| void | setFactory(TubeFactory factory)<br>    Sets tube factory property |
| void | setGoAfter(java.util.Set<java.lang.String> goAfter)<br>    Sets go after items names |
| void | setGoBefore(java.util.Set<java.lang.String> goBefore)<br>    Sets go before items names |
| void | setName(java.lang.String name)<br>    Sets item name |
| void | setRequired(java.util.Set<java.lang.String> required)<br>    Sets item names that must be present in final tubeline |

| Methods inherited from class java.lang.Object |
|---|
| getClass, notify, notifyAll, toString, wait, wait, wait |

TubelineAssemblerItem
   public TubelineAssemblerItem(java.lang.String name, TubeFactory factory)
   Creates item with name and factory. Item supports no services and mandates no ordering or requirements for other items.
   Parameters:
   name—Item name
   factory—Tube factory
TubelineAssemblerItem
public TubelineAssemblerItem(java.lang.String name,
   TubeFactory factory,
   java.util.Set<java.lang.String>goAfter,
   java.util.Set<java.lang.String>goBefore,
   java.util.Set<java.lang.String>required)
   Creates item with name, factory, mandates on items that must go before or go after this item, and set of required names or service values that must be present in the final tubeline.
   Parameters:
   name—Item name
   factory—Tube factory
   goAfter—Set of item or service names for items that must be sorted after this item
   goBefore—Set of item or service names for items that must be sorted ahead of this item.
   required—Set of item or service names that must be present in the final tubeline
   getFactory
public TubeFactory getFactory()
   Gets tube factory property
   Returns:
   Tube factory
   setFactory
public void setFactory(TubeFactory factory)
   Sets tube factory property
   Parameters:
   factory—Tube factory
   getGoAfter
public java.util.Set<java.lang.String>getGoAfter( )
   Gets set of item names for items that must go after this item
   Returns:
   Set of items that go after this item
   setGoAfter
public void setGoAfter
   (java.util.Set<java.lang.String>goAfter)
   Sets go after items names
   Parameters:
   goAfter—Go after items
   getGoBefore
public java.util.Set<java.lang.String>getGoBefore( )
   Gets set of item names for items that must go before this item
   Returns:
   Set of items that go before this item
   setGoBefore public void setGoBefore
   (java.util.Set<java.lang.String>goBefore)
   Sets go before items names
   Parameters:
   goBefore—Go before items
   getName
public java.lang.String getName( )
   Gets item name
   Returns:
   Item name
   setName
public void setName(java.lang.String name)
   Sets item name
   Parameters:
   name—Item name
   getRequired
public java.util.Set<java.lang.String>getRequired( )
   Gets set of item names that must be present in final tubeline
   Returns:
   Required set
   setRequired
public void setRequired
   (java.util.Set<java.lang.String>required)
   Sets item names that must be present in final tubeline
   Parameters:
   required—Required set
   hashCode
public int hashCode( )
   Overrides:
   hashCode in class java.lang.Object
   equals
public boolean equals(java.lang.Object obj)
   Overrides:
   equals in class java.lang.Object
   TubeFactory
   Interface for tube factory specific to TubelineAssemblerItem.
   FIG. 6 illustrates a TubeFactory interface.
   Interface TubeFactory
   All Known Implementing Classes:
   AbstractTubeFactory
public interface TubeFactory
   Generates a Tube for a JAX-WS RI tubeline and links it into the existing tube chain.

| Method Summary | |
| --- | --- |
| com.sun.xml.ws.api.pipe.Tube | createClient(com.sun.xml.ws.api.pipe.Tube next, com.sun.xml.ws.api.pipe.ClientTubeAssemblerContext context) Adds Tube to tubeline at client. |
| com.sun.xml.ws.api.pipe.Tube | createServer(com.sun.xml.ws.api.pipe.Tube next, com.sun.xml.ws.api.pipe.ServerTubeAssemblerContext context) Adds Tube to tubeline at server. | createClient
com.sun.xml.ws.api.pipe.Tube createClient(com.sun.xml.ws.api.pipe.Tube next,
   com.sun.xml.ws.api.pipe.ClientTubeAssemblerContext context)
   Adds Tube to tubeline at client.
   Parameters:
   next—Next tube in tubeline; may be intermediate tube or transport.
   context—Client context Returns:

Newly linked-in lead tube or next argument to leave tubeline unchanged.

createServer com.sun.xml.ws.api.pipe.Tube createServer(com.sun.xml.ws.api.pipe.Tube next,
com.sun.xml.ws.api.pipe.ServerTubeAssemblerContext context)

Adds Tube to tubeline at server.

Parameters:

next—Next tube in tubeline; may be intermediate tube or invoker.

context—Server context

Returns:

Newly linked-in lead tube or next argument to leave tubeline unchanged.

AbstractTubeFactory

Abstract implementation for TubeFactory

Class AbstractTubeFactory java.lang.Object
└weblogic.wsee.jaxws.tubeline.AbstractTubeFactory All Implemented Interfaces:

TubeFactory public abstract class AbstractTubeFactory
extends java.lang.Object
implements TubeFactory Abstract implementation of (@link TubeFactory}. Each create method returns the next tube argument, which makes no modification to the tubeline. Implementers of concrete tube factories may choose to override createClient or createServer, as desired.

| Constructor Summary |
| --- |
| AbstractTubeFactory( ) |

| Constructor Summary |
| --- |
| AbstractTubeFactory( ) |

| Constructor Summary |
| --- |
| AbstractTubeFactory( ) |

| Method Summary | |
| --- | --- |
| com.sun.xml.ws.api.pipe.Tube | createClient(com.sun.xml.ws.api.pipe.Tube next, com.sun.xml.ws.api.pipe.ClientTubeAssemblerContext context)<br>Adds Tube to tubeline at client. |
| com.sun.xml.ws.api.pipe.Tube | createServer(com.sun.xml.ws.api.pipe.Tube next, com.sun.xml.ws.api.pipe.ServerTubeAssemblerContext context)<br>Adds Tube to tubeline at server. |
| com.sun.xml.ws.api.pipe.Tube | createClient(com.sun.xml.ws.api.pipe.Tube next, com.sun.xml.ws.api.pipe.ClientTubeAssemblerContext context)<br>Adds Tube to tubeline at client. |
| com.sun.xml.ws.api.pipe.Tube | createServer(com.sun.xml.ws.api.pipe.Tube next, com.sun.xml.ws.api.pipe.ServerTubeAssemblerContext context)<br>Adds Tube to tubeline at server. |

AbstractTubeFactory public AbstractTubeFactory( )

createClient public com.sun.xml.ws.api.pipe.Tube createClient(com.sun.xml.ws.api.pipe.Tube next,
com.sun.xml.ws.api.pipe.ClientTubeAssemblerContext context)

Description copied from interface: TubeFactory

Adds Tube to tubeline at client.

Specified by:

createClient in interface TubeFactory

Parameters:

next—Next tube in tubeline; may be intermediate tube or transport.

context—Client context

Returns:

Newly linked-in lead tube or next argument to leave tubeline unchanged.

createServer public com.sun.xml.ws.api.pipe.Tube createServer(com.sun.xml.ws.api.pipe.Tube next,
com.sun.xml.ws.api.pipe.ServerTubeAssemblerContext context)

Description copied from interface: TubeFactory

Adds Tube to tubeline at server.

Specified by:

createServer in interface TubeFactory

Parameters:

next—Next tube in tubeline; may be intermediate tube or invoker.

context—Server context

Returns:

Newly linked-in lead tube or next argument to leave tubeline unchanged.

Ordering

Utility class for resolving ordering requirements.

Class Ordering java.lang.Object
└java.util.AbstractCollection<TubelineAssemblerItem>
└weblogic.wsee.jaxws.tubeline.Ordering All Implemented Interfaces:
    java.lang.Iterable<TubelineAssemblerItem>,
    java.util.Collection<TubelineAssemblerItem>
public class Ordering
extends
    java.util.AbstractCollection<TubelineAssemblerItem>
    Resolves ordering dependencies for a collection of {@link TubelineAssemblerItem}.

| Constructor Summary |
| --- |
| Ordering( ) |
| Ordering(java.util.Collection<TubelineAssemblerItem> items) |

| Method Summary | |
| --- | --- |
| boolean | add(TubelineAssemblerItem o) |
| java.util.Iterator<TubelineAssemblerItem> | iterator( ) |
| int | size( ) |

| Methods inherited from class java.util.AbstractCollection |
| --- |
| addAll, clear, contains, containsAll, isEmpty, remove, removeAll, retainAll, toArray, toArray, toString |

| Methods inherited from class java.lang.Object |
| --- |
| equals, getClass, hashCode, notify, notifyAll, wait, wait, wait |

| Methods inherited from interface java.util.Collection |
| --- |
| equals, hashCode |

Ordering
public Ordering( )
    Ordering
public    Ordering(java.util.Collection<TubelineAssemblerItem>items)
    iterator
public java.util.Iterator <TubelineAssemblerItem>iterator( )
    Specified by:
        iterator in interface java.lang.Iterable<TubelineAssemblerItem>
    Specified by:
        iterator in interface java.util.Collection<TubelineAssemblerItem>
    Specified by:
        iterator in class java.util.AbstractCollection<TubelineAssemblerItem>
    add
public boolean add(TubelineAssemblerItem o)
    Specified by:
        add in interface java.util.Collection<TubelineAssemblerItem>
    Overrides:
        add in class java.util.AbstractCollection<TubelineAssemblerItem>
    size
public int size( )
    Specified by:
        size in interface java.util.Collection <TubelineAssemblerItem>
    Specified by:
        size in class java.util.AbstractCollection <TubelineAssemblerItem>
    TubeFactoryCreator
    Service interface for creating TubeFactory interfaces from Class instances. Useful for allowing meta-data file to support other technologies, such as a Handler class name.
    Interface TubeFactoryCreator
public interface TubeFactoryCreator
    Service interface for creating TubeFactory instance from configured class. Environments can register available TubeFactoryCreator implementations using the services framework. Registered implementations are located by searching the classpath for META-INF/services/weblogic.wsee.jaxws.tubeline.TubeFactoryCreator resources. On the server, the classloader for the service implementation class will be used. On the client, the classloader of the client delegate can be used. Located resources can indicate text files containing implementations class names, one per line.

| Method Summary | |
| --- | --- |
| TubeFactory | create(java.lang.Class c)<br>Creates TubeFactory instance based on a given class; typically read from meta-data. | create
TubeFactory create(java.lang.Class c)
    Creates TubeFactory instance based on a given class; typically read from meta-data.
    Parameters:
    c—Class instance
    Returns:
    Tube factory generated in an implementation dependent fashion from an instance of the parameter class. Return null if this creator does not generate tube factories for the parameter class type.
    TubelineDeploymentListenerCreator
    Service interface for creating TubelineDeploymentListener interfaces from Class instances. Useful for allowing meta-data file to support other technologies, such as a WsDeploymentListener class name.
    Interface TubelineDeploymentListenerCreator
public interface TubelineDeploymentListenerCreator
    Service interface for creating TubelineDeploymentListener instance from configured class. Environments can register available TubelineDeploymentListenerCreator implementations using the services framework. In one embodiment, registered implementations can be located by searching the classpath for META-INF/services/weblogic.wsee.jaxws.tubeline.TubelineDeploymentListenerCreator resources. On the server, the classloader for the service implementation class can be used. On the client, the classloader of the client delegate can be used. Located resources can indicate text files containing implementations class names, one per line.

| Method Summary | |
|---|---|
| TubelineDeploymentListener | create(java.lang.Class c)<br>Creates TubelineDeploymentListener instance based on a given class; typically read from meta-data. | create
TubelineDeploymentListener create(java.lang.Class c)
Creates TubelineDeploymentListener instance based on a given class; typically read from meta-data.
Parameters:
c—Class instance
Returns:
Tubeline deployment listener generated in an implementation dependent fashion from an instance of the parameter class. Return null if this creator does not generate tubeline deployment listeners for the parameter class type.
Non-Java Programming Interfaces
For the Meta-data File and Schema, Tubeline deployment functionality can support the configuration of TubelineDeploymentListener implementations and/or TubelineAssemblerItem values through the use of the META-INF/tube-config.xml file. In one embodiment, environments can have multiple meta-data files, as long as they are available to the class loader's resource loading support, and each meta-data file will be processed.

config
```
<xsd:element name="config">
    <xsd:complexType>
        <xsd:sequence>
            <xsd:element name="deployment-listeners" type="deployment-listeners"/>
        </xsd:sequence>
    </xsd:complexType>
</xsd:element>
```

This can be the top-level element for tube-config.xml. The config element can contain the deployment-listeners element and will be the extension point for later additions of other non-deployment listener related configuration.
deployment-listeners

```
<xsd:complexType name="deployment-listeners">
    <xsd:sequence>
        <xsd:element name="client" type="listeners" minOccurs="0"/>
        <xsd:element name="server" type="listeners" minOccurs="0"/>
    </xsd:sequence>
</xsd:complexType>
```

Top-level type for deployment listener configuration can separate configuration between client and server.
listeners

```
<xsd:complexType name="listeners">
    <xsd:sequence>
        <xsd:element name="listener" type="listener" minOccurs="0" maxOccurs="unbounded"/>
        <xsd:element name="assembler-item" type="assembler-item" minOccurs="0" maxOccurs="unbounded"/>
    </xsd:sequence>
</xsd:complexType>
```

The listener's type can support configuring zero-or-more TubelineDeploymentListener instances and/or zero-or-more TubelineAssemblerItem values.
listener

```
<xsd:complexType name="listener">
    <xsd:attribute name="class" type="xsd:string" use="required"/>
</xsd:complexType>
```

Can configure class name for TubelineDeploymentListener. If the class described by the class attribute implements TubelineDeploymentListener, then an instance can be used straight away. Otherwise, configured service implementations of TubelineDeploymentListenerCreator are consulted. This functionality can be intended to allow the class name to specify a WsDeploymentListener class or an instance of another technology.
assembler-item

```
<xsd:complexType name="assembler-item">
    <xsd:sequence>
        <xsd:element name="after" type="list" minOccurs="0"/>
        <xsd:element name="before" type="list" minOccurs="0"/>
        <xsd:element name="required" type="list" minOccurs="0"/>
    </xsd:sequence>
    <xsd:attribute name="class" type="xsd:string" use="required"/>
    <xsd:attribute name="name" type="xsd:string" use="optional"/>
</xsd:complexType>
```

Can configure values for instance of TubelineAssemblerItem, including the class name for the implementation of TubeFactory. If the class described by the class attribute implements TubeFactory, then an instance can be used straight away. Otherwise, configured service implementations of TubeFactoryCreator can be consulted. This functionality can allow the class name to specify a Handler class or an instance of another technology.
list

```
<xsd:complexType name="list">
    <xsd:sequence>
        <xsd:element name="item" type="xsd:string" minOccurs="1" maxOccurs="unbounded"/>
    </xsd:sequence>
</xsd:complexType>
```

Simple ordered list of strings.
In one embodiment, Tubeline deployment only occurs during web service deployment, there need be no strict performance requirements (e.g. not involved in performance test suite code paths). However, care should be taken to ensure that tubeline deployment does not negatively impact deployment time or server start-up time, if services are deployed at server start-up.

The invention claimed is:
1. A computer-based system comprising:
a computer, including a computer readable medium and processor;
a common handler framework, executing on the computer, that enables handlers for multiple different types of web services programming models to be used in a single handler chain;
a plurality of handlers, each using one of the multiple different types of web services programming models;

wherein the common handler framework
identifies an execution environment,
based on the execution environment, determines which of the plurality of handlers are native handlers configured to be used in the execution environment, and which are foreign handlers configured to be used in a different execution environment,
wraps each foreign handler such that it appears to the execution environment as a native handler,
adds the plurality of handlers to the single handler chain, and
at runtime, invokes each handler in the single handler chain, wherein each foreign handler in the single handler chain is invoked using a simulation layer of the common handler framework.

2. The computer-based system of claim 1, wherein one of the multiple different types of web services programming models is JAX-WS.

3. The computer-based system of claim 1, wherein one of the multiple different types of web services programming models is JAX-RPC.

4. The computer-based system of claim 1, wherein the common handler framework provides data to a foreign handler in the format native to the web services programming model of the handler.

5. The computer-based system of claim 1, wherein at least one of the handlers are provided by a middleware environment.

6. The computer-based system of claim 5, wherein at least one the handler provided by the middleware environment includes a security handler.

7. The computer-based system of claim 5, wherein at least one the handler provided by the middleware environment includes a reliable messaging handler.

8. The computer-based system of claim 5, wherein at least one the handler provided by the middleware environment includes a transaction handler.

9. The computer-based system of claim 5, wherein another handler is provided by a web service application running on the middleware environment.

10. The computer-based system of claim 1, wherein the common handler framework provides for a wrapper over at least one of the handlers.

11. A non-transitory computer-readable storage medium including code to provide:
a common handler framework, executing on a computer, including a computer readable medium and processor, that enables handlers for multiple different types of web services programming models to be used in a single handler chain;
a plurality of handlers, each using one of the multiple different types of web services programming models;
wherein the common handler framework
identifies an execution environment,
based on the execution environment, determines which of the plurality of handlers are native handlers configured to be used in the execution environment, and which are foreign handlers configured to be used in a different execution environment,
wraps each foreign handler such that it appears to the execution environment as a native handler,
adding the plurality of handlers to the single handler chain, and
at runtime, invoking each handler in the single handler chain, wherein each foreign handler in the single handler chain is invoked using a simulation layer of the common handler framework.

12. The non-transitory computer-readable storage medium of claim 11, wherein one of the multiple different types of web services programming models is JAX-WS.

13. The non-transitory computer-readable storage medium of claim 11, wherein one of the multiple different types of web services programming models is a JAX-RPC.

14. The non-transitory computer-readable storage medium of claim 11, wherein the common handler framework provides data a foreign handler in the format native to the web services programming model of the handler.

15. The non-transitory computer-readable storage medium of claim 11, wherein at least one of the handlers is provided by a middleware environment.

16. The non-transitory computer-readable storage medium of claim 15, wherein another handler is provided by a web service application running on the middleware environment.

17. The non-transitory computer-readable storage medium of claim 11, wherein the common handler framework provides for a wrapper over at least one of the handlers.

18. A computer-based method comprising:
providing a common handler framework, executing on a computer, including a computer readable medium and processor, which enables handlers for multiple different types of web services programming models to be used in a single handler chain;
providing a plurality of handlers, each using one of the multiple different types of web services programming models;
identifying an execution environment;
based on the execution environment, determines which of the plurality of handlers are native handlers configured to be used in the execution environment, and which are foreign handlers configured to be used in a different execution environment; and
wrapping each foreign handler such that it appears to the execution environment as a native handler;
adding the plurality of handlers to the single handler chain, and
at runtime, invoking each handler in the single handler chain, wherein each foreign handler in the single handler chain is invoked using a simulation layer of the common handler framework.

19. The computer-based method of claim 18, wherein one of the multiple different types of web services programming models is JAX-WS.

20. The computer-based method of claim 18, wherein one of the multiple different types of web services programming models is JAX-RPC.

21. The computer-based method of claim 18, wherein the common handler framework provides data to a foreign handler in the format native to the web services programming model of the handler.

22. The computer-based method of claim 18, wherein at least one of the handlers are provided by a middleware environment.

* * * * *

UNITED STATES PATENT AND TRADEMARK OFFICE
CERTIFICATE OF CORRECTION

| | | |
|---|---|---|
| PATENT NO. | : 8,024,746 B2 | Page 1 of 1 |
| APPLICATION NO. | : 11/952728 | |
| DATED | : September 20, 2011 | |
| INVENTOR(S) | : Eberhard | |

It is certified that error appears in the above-identified patent and that said Letters Patent is hereby corrected as shown below:

In column 1, line 29, after "TubeFactoryCreator" insert -- . --.

In column 1, line 30, after "TubelineDeploymentListenerCreator" insert -- . --.

In column 9, line 40-41, delete "StandalonePipeAssempler," and insert -- StandalonePipeAssembler, --, therefor.

In column 14, line 14, delete "contex," and insert -- context, --, therefor.

In column 14, line 48, delete "contex," and insert -- context, --, therefor.

In column 25, line 31, in Claim 6, delete "one the handler" and insert -- one of the handler --, therefor.

In column 25, line 34, in Claim 7, delete "one the handler" and insert -- one of the handler --, therefor.

In column 25, line 37, in Claim 8, delete "one the handler" and insert -- one of the handler --, therefor.

Signed and Sealed this
Thirteenth Day of December, 2011

David J. Kappos
*Director of the United States Patent and Trademark Office*